United States Patent [19]

Taniguchi et al.

[11] Patent Number: 4,514,073
[45] Date of Patent: Apr. 30, 1985

[54] AUTOMATIC EXPOSURE CONTROL CAMERA

[75] Inventors: Nobuyuki Taniguchi, Tondabayashi; Hiroshi Hosomizu, Nara; Toru Inoue, Toyonaka; Masaaki Nakai, Nara; Takanobu Omaki, Sennan; Masatake Niwa; Minoru Sekida, both of Sakai, all of Japan

[73] Assignee: Minolta Camera Kabushiki Kaisha, Osaka, Japan

[21] Appl. No.: 540,039

[22] Filed: Oct. 7, 1983

[30] Foreign Application Priority Data

Oct. 21, 1982 [JP]  Japan ................................ 57-185638

[51] Int. Cl.³ .................... G03B 17/08; G03B 15/05; G03B 17/18
[52] U.S. Cl. .................................. 354/414; 354/416; 354/431; 354/471
[58] Field of Search ............................ 354/416–418, 354/431, 434, 480, 481, 465, 471, 479, 414, 429, 433

[56] References Cited

U.S. PATENT DOCUMENTS 4,359,275 11/1982 Hasegawa ........................ 354/416

FOREIGN PATENT DOCUMENTS 57-78031  5/1982  Japan .
57-85033  5/1982  Japan .
57-108833 7/1982  Japan .

*Primary Examiner*—William B. Perkey
*Attorney, Agent, or Firm*—Watson Cole Grindle & Watson

[57] ABSTRACT

An automatic exposure control camera is of a type capable of controlling both the camera exposure and the flash light amount to be emitted by an electronic flash device. The automatic exposure control camera includes an average light measuring device for measuring an amount of the entire light impinging on an image forming plane and for producing an average signal representing the average light amount, and a spot light measuring device for measuring an amount of light impinging on a spot of the image forming plane and for producing a spot signal representing the light amount at the spot. When taking a photograph with the aid of flash light from a flash device, the amount of light impinging on the film surface is measured and integrated in real time using the average signal, and when the integrated amount reaches a predetermined level, the flash device is controlled so as to stop the emission of flash light, thereby photographing the object with an appropriate light amount even when the object is located at a corner of the frame.

10 Claims, 4 Drawing Figures

AUTOMATIC EXPOSURE CONTROL CAMERA

BACKGROUND OF THE INVENTION

1. Field of the invention

The present invention relates to an automatic exposure control camera capable of controlling both the camera exposure and the flash light amount to be emitted by an electronic flash device.

2. Description of the Prior Art

The above-mentioned type of camera has been known in this field of art, such as disclosed in U.S. Pat. No. 4,359,275. According to such prior art, the camera comprises means for measuring light capable of producing a light measuring signal, first means for automatically controlling the camera exposure, second means for automatically controlling the flash light amount, and means for interconnecting the first and second controlling means with the measuring means to enable the first and second controlling means to respond to the light measuring signal.

Another type of camera having a spot measuring means and an overall measuring means is also known, such as the LEICA R4 of Ernst Leitz Wetzlar GmbH of West Germany in which a switching means is further provided for selectively actuating either the spot measuring means or the overall measuring means. When the spot measuring means is actuated, the brightness of an image formed on a film frame is measured at a narrow area, or at a spot, at about the center of the film frame, and when the overall measuring means is actuated, the brightness of an image on the film frame is measured at a wide area covering almost all of the image. Thus, it can be said that when the spot measuring means is actuated, the brightness of an object located at the center of the film frame is measured with a high accuracy. And, when the overall measuring means is actuated, an average brightness of the entire image can be measured. From this view point, the overall measuring means is also referred to as an average measuring means.

According to the prior art, no attempts have been made to provide both the spot measuring feature and overall measuring feature to the first mentioned type of automatic exposure control camera, that is capable of controlling both the camera exposure and the flash light amount to be emitted by an electronic flash device.

SUMMARY OF THE INVENTION

The object of the present invention is to provide a camera capable of controlling, using the measured amount of light, both the camera exposure and the flash light amount to be emitted by an electronic flash device, wherein an improvement is made to provide spot measuring means and overall measuring means, which can be operated selectively.

Another object of the present invention is to provide a camera of the above described type which has improvements made from the view point of practical use, taking into consideration the various problems which would arise when combining both the spot measuring means and overall measuring means to the automatic exposure control type camera capable of controlling both the camera exposure and the flash light amount to be emitted by an electronic flash device.

The problems that would arise when combining both the spot measuring means and overall measuring means with a selecting means to select either one of the spot measuring means and overall measuring means to the automatic exposure control type camera are as follows.

In the case of controlling the flash light amount to be emitted by an electronic flash device based on the amount of light measured through the spot measurement, the main object to be photographed may not always be at the center of the film frame where the spot measurement is effected, but may be at the corner of the film frame according to the photographer's intention. In this case, since the spot measuring carried out during the light emission from the electronic flash device is not done on the main object, the light amount detected by the spot measuring means is different from the light amount reflected from the main object. Thus, a problem arises such that the main object will not be photographed with an appropriate light amount when the spot measurement is carried out during the flash photographing mode.

Also, in the case of controlling the flash light amount to be emitted by an electronic flash device based on the amount of light measured through the spot measurement, a light receiving element provided for the spot measurement is very small when compared with the light receiving element provided for the overall measurement and, therefore, the output current from the former is also small. Thus, the circuit connected to the light receiving element for the spot measurement has a poor response, particularly with respect to those flash lights that have a rapid change of light intensity. Thus, it is very difficult to carry out the control of flash light amount with a high accuracy.

Furthermore, if a spot measuring device is adopted to a through-the-lens measuring arrangement having an optical system, such as shown in FIG. 2, a light measuring device PDS of the spot measuring device will be located at a position aimed at the center of an image formed on a sub-mirror 15. In other words, if such an arrangement is employed, the optical axis of the lens assembly 4 intercepts the optical axis of the light measuring device PDS on the surface of sub-mirror 15. The sub-mirror 15 is normally in a flip-down position, as shown in FIG. 2, so as to reflect a bundle of light rays which have been emitted from the object and have passed through the objective lens assembly 4 and main mirror 14. Then, when the shutter 3 opens, the sub-mirror 15 flips up together with the main mirror 14, as shown in FIG. 3. In this position, the light receiving element PDS receives light rays reflected not from the sub-mirror 15, but from a surface of a film 2. In this case, the light receiving element PDS is not in a position aiming at the center of an image formed on a sub-mirror 15, but in a position aiming at point deviated upwardly by a distance D from the center of the image as is indicated in FIG. 2. Thus, if the spot light measuring is carried out during the exposure under the flash light photographing mode for controlling the amount of flash light, the spot measuring device measures not exactly on the aiming spot but on a spot deviated from the aimed at spot. Thus, under the flash photographing mode, it is not appropriate to use the measured amount of light through the spot measurement for controlling the amount of flash light to be emitted from the electronic flash device.

With the above problems taken into consideration, an improved automatic exposure control camera according to the present invention comprises means for measuring light capable of alternatively producing a first signal indicative of a light measuring result covering a relatively wide area of the object scene. A second signal is indicative of a light measuring result covering a relatively narrow area of the object scene. First means for automatically controlling the camera exposure in response to the measuring means, and second means automatically controls the flash light amount in response to the measuring means. There are also means for selecting between the first controlling means and the second controlling means in responding to the measuring means. The selecting means includes first means for interconnecting the first controlling means with the measuring means to enable the first controlling means to selectively respond to either of the first and second signals in controlling the camera exposure, and second means for interconnecting the second controlling means with the measuring means to restrict the second controlling means to respond to only the first signal in controlling the flash light amount.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
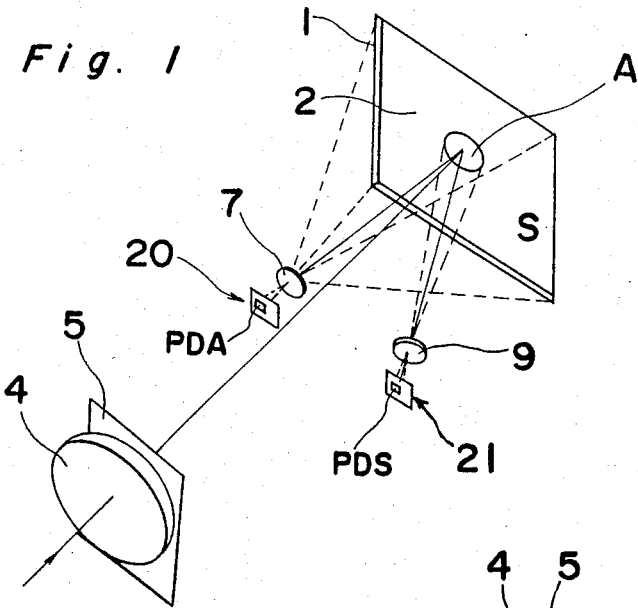
FIG. 1 is a diagrammatic view of a fundamental arrangement of an optical system according to the present invention.
Figure 2:
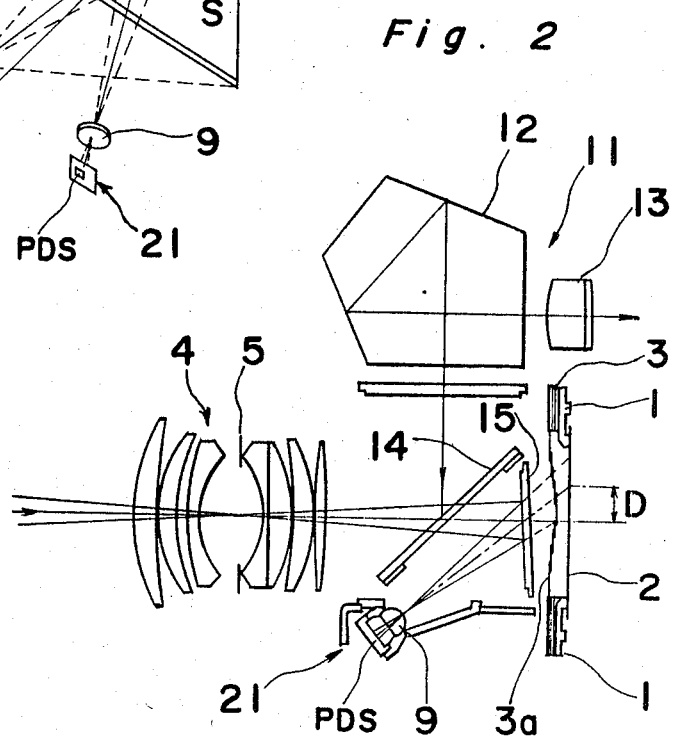
FIG. 2 is a diagrammatic view of a camera employing the optical arrangement of FIG. 1, particularly showing a condition before the exposure.
Figure 3:
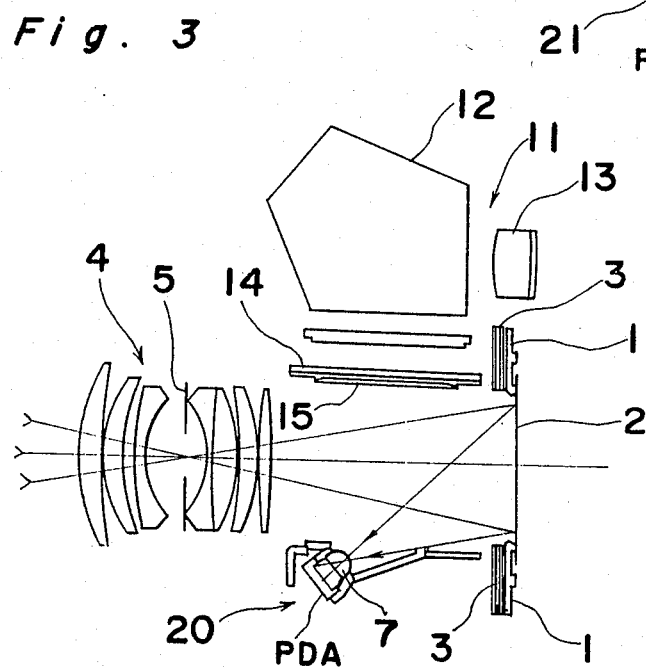
FIG. 3 is a view similar to FIG. 2, but particularly showing a condition during the exposure.

Referring to FIG. 1, a diagrammatic view of a fundamental arrangement of an optical system of the camera according to the present invention is shown. In FIG. 1, a reference number 1 designates a frame provided in the camera body (not shown). Within frame 1, a photographic film 2 extends. Thus, an image to be photographed will be formed on a surface of the film 2, and such a surface is generally referred to as image forming plane S. As shown in FIGS. 2 and 3, a shutter mechanism 3 including a leading curtain and trailing curtain is positioned in front of, and closely adjacent, the frame 1.

A reference number 4 designates an objective lens assembly, and 5 designates an aperture for photographing. As shown by a solid line in FIG. 1, lights from an object (not shown) to be photographed passes through the lens assembly 4 and aperture 5, and impinges on a surface of the film 2 extending on the image forming plane S.

A reference number 20 designates an average light measuring device positioned at an appropriate place in front of the frame 1. The average light measuring device 20 is defined by a condensing lens 7 and a light receiving element PDA. The average light measuring device 20 is so arranged that the condensing lens 7 gathers light beams from a relatively wide area on the image forming plane S, for example from all the points on the image forming plane S, and directs the gathered light beams to the light receiving element PDA. Thus, the light receiving element PDA receives light reflected from all the points on the film surface 2, and produces a first voltage signal relative to the brightness of the image formed on the film surface 2. Since the light receiving element PDA receives light reflected from all the points on the film surface 2, it can be said that the first voltage signal represents the average brightness of the formed image. In view of this, the light measuring carried out by the average light measurement device 20 is referred to as average light measurement.

A reference number 21 designates a spot light measuring device positioned at an appropriate place in front of the frame 1. The spot light measuring device 21 is defined by a condensing lens 9 and a light receiving element PDS. The spot light measuring device 21 is so arranged that the condensing lens 9 gathers light beams from a relatively narrow area on the image forming plane S, for example from a circle A located at the center of the image forming plane S, and directs the gathered light beams to the light receiving element PDS. Thus, the light receiving element PDS receives light reflected only from the spot A on the film surface 2, and produces a second voltage signal relative to the brightness of the image formed on the spot A of the film surface 2. Since the light receiving element PDS receives light reflected from the spot A on the film surface 2, it can be said that the second voltage signal represents the brightness of the image formed on the spot A. In view of this, the light measurement carried out by the spot light measurement device 21 is referred to as spot light measurement.

Next, the structure and operation of the camera according to the present invention are described.

Referring to FIG. 2, a diagrammatic view of a camera employing the optical arrangement of FIG. 1 is shown, and particularly showing a condition before the exposure. Before the exposure, the aperture 5 is held to the fully opened condition and, at the same time, the main mirror 14 made of a translucent plate and the sub-mirror 15 are both held in the flip-down position. Thus, the light from the object passes through the lens assembly 4 and the aperture 5, and partly reflect on the main mirror 14 for directing the image of the object to a viewfinder 13 through a prism 12. The remaining light passes through the main mirror 14 and reflects on the sub-mirror 15. The lights reflected from the sub-mirror 15 are directed to the average and spot light measuring devices 20 and 21. In FIG. 2, only the spot light measuring device 21 is shown. Accordingly, before the exposure, the first voltage signal represents the average brightness of the image being produced from the average light measuring device 20, and the second voltage signal represents the brightness of the image formed on a central spot A being produced from the spot light measuring device 21.

Referring to FIG. 3, a condition is shown, wherein the shutter has been released to effect the film exposure. To accomplish this condition, first, a shutter button (not shown) is halfway depressed. Accordingly, the aperture 5 is stopped down to a set value, or to a calculated value Av through known mechanisms, and at the same time, the main mirror 14 and the sub-mirror 15 flip up through known mechanisms to clear the light path from the objective lens 4 to a shutter mechanism 3. Then, upon full depression of a shutter button (not shown), a shutter 3a opens to form an image of the object on the film surface 2 through the lens assembly 4 and the aperture 5. The image formed on the film surface 2 is sensed by both the average and spot light measuring devices 20 and 21. In FIG. 3, only the average light measuring device 20 is shown. Accordingly, during the exposure, the first voltage signal representing the average brightness of the image formed on the film surface 2 is produced from the average light measuring device 20, and the second voltage signal representing the brightness of the image formed on a central spot A of the same film surface is produced from the spot light measuring device 21.

Generally, the calculation for the exposure control and the display of the calculated value are carried out before the exposure and, therefore, such a calculation and display are carried out using first and second voltage signals obtained before the exposure.

When taking a photograph with the aid of flash light under real time control, the amount of light impinging on the film surface is measured during the exposure, and when the total light amount reaches a required level, a stop signal is applied to the electronic flash device to stop the emission of flash light. For the reasons explained in the "SUMMARY OF THE INVENTION", according to the present invention, only the first voltage signal representing the average brightness of the image formed on the film surface is used for the real time control of the flash light.

Figure 4:
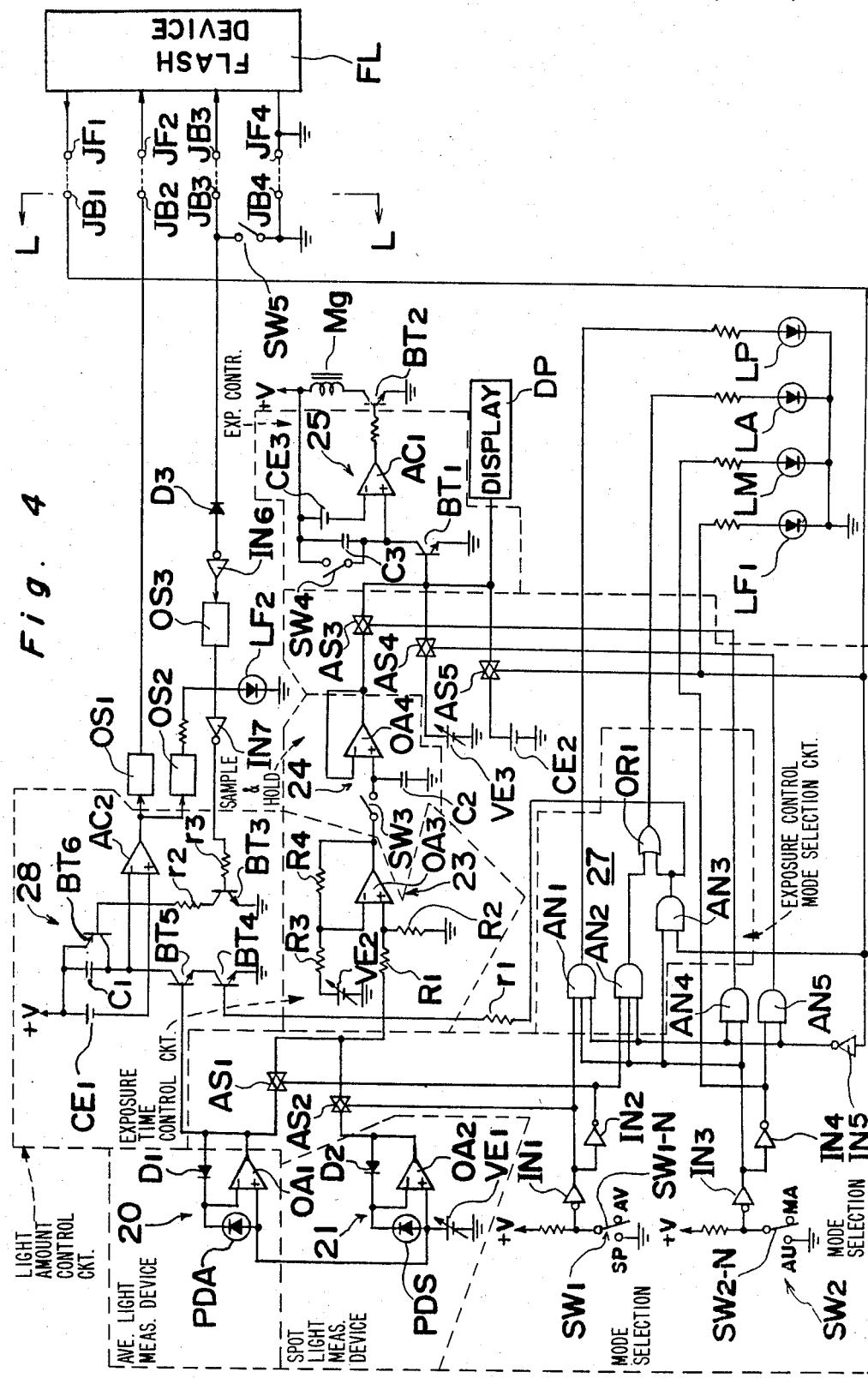
FIG. 4 is a circuit diagram used in the present invention.

In order to accomplish the above-mentioned calculation and display for the exposure control and real time control of the flash light, a circuit arrangement shown in FIG. 4 is provided.

Referring to FIG. 4, a circuit portion shown on the left-hand side of a line L—L is provided in the camera body, while a circuit portion shown on the right-hand side thereof is an electronic flash device FL. The circuit in the camera body has terminals JB1, JB2, JB3 and JB4 mounted in the camera body, which are connectable respectively to terminals JF1, JF2, JF3 and JF4 of the flash device FL.

The average light measuring device 20 includes the light receiving element PDA which is connected to an operational amplifier OA1. The average light measuring device 20 further includes a logarithmic compression diode D1 coupled to the operational amplifier OA1 and a DC voltage source VE1 producing a voltage signal representing the film sensitivity Sv in the APEX numbering system. The first voltage signal representing the average brightness of the image is produced from the operational amplifier OA1, and this first voltage signal can be given by an equation:

$$Bva + Sv - Avo$$

wherein Bva is a value given in the APEX numbering system representing the brightness of the object by the average measurement, and Avo is a value in the APEX numbering system representing the fully opened aperture.

The spot light measuring device 21 includes the light receiving element PDS which is connected to an operational amplifier OA2. The spot light measuring device 20 further includes a logarithmic compression diode D2 coupled to the operational amplifier OA2 and the DC voltage source VE1 producing the voltage signal representing the film sensitive Sv. The second voltage signal representing the brightness of the image formed on the central spot A is produced from the operational amplifier OA2, and this second voltage signal can be given by an equation:

$$Bvp + Sv - Avo$$

wherein Bvp is a value given in the APEX numbering system representing the brightness of the object measured through the spot measurement.

As is apparent from FIG. 4, the DC voltage source VE1 is connected to both operational amplifiers OA1 and OA2 at their non-inverting inputs, and produces a voltage signal representing the sensitivity of a film loaded in the camera in APEX numbering system.

The output of the operational amplifier OA1 of the average measuring device 20 is connected to an exposure time control circuit 23 through an analog switch AS1, and the output of the operational amplifier OA2 of the spot measuring device 21 is connected to said exposure time control circuit 23 through an analog switch AS2.

The exposure time control circuit 23 comprises an operational amplifier OA3, a variable DC source VE2 for producing a voltage signal in the APEX numbering system representing a set aperture value (Avs−Avo), and resistors R1 through R4. The non-inverting input of the operational amplifier OA3 receives either the first voltage signal from the average measuring device 20 through the analog switch AS1 or the second voltage signal from the spot measuring device 21 through the analog switch AS2. The inverting input of the operational amplifier OA3 receives the set aperture value signal (Avs−Avo) from the variable DC source VE2.

The operational amplifier OA3 produces a voltage signal in the APEX numbering system representing the exposure time for the aimed exposure control. The exposure time is either Tva or Tvp, and according to the produced exposure time signal Tva or Tvp, the shutter mechanism opens to effect the film exposure. Here, the exposure time signal Tva is produced when the average light measuring is carried out before the exposure and, therefore, if the aperture value is given by Avs, the exposure time signal Tva can be expressed as:

$$Tva = Bva + Sv - Avs.$$

On the other hand, the exposure time signal Tvp is produced when the spot light measurement is carried out before the exposure and, therefore, if the aperture value is given by Avs, the exposure time signal Tvp can be expressed as:

$$Tvp = Bvp + Sv - Avs.$$

The output of the exposure time control circuit 23 is connected to a switch SW3 and further to a memory capacitor C2 and to an operational amplifier OA4. The switch SW3 is provided such that it turns off immediately before the exposure, i.e., before the flip-up motion of the mirrors 14 and 15. It is to be noted that the switch SW3, memory capacitor C2 and operational amplifier OA4 define a sample-and-hold circuit 24. The output of the sample-and-hold circuit 24 is connected to an analog switch AS3 and, in turn, to both an exposure control circuit 25 and a digital display device DP. The digital display device DP displays exposure time based on the aimed exposure control.

The exposure control circuit 25 comprises a logarithmic expansion transistor BT1, capacitor C3 for signal integration, normally-closed switch SW4 which opens simultaneously with the start of exposure on the film surface 2, DC voltage source CE3 for producing a reference voltage representing an appropriate exposure level under day light photographing, and comparator AC1. The base of the transistor BT1 receives the exposure time signal Tva or Tvp based on the aimed exposure control. Thus, the collector current of the transistor BT1 is representative of the exposure time signal Tva or Tvp. Upon the start of opening of the shutter mechanism, the switch SW4 opens, thereby charging the capacitor C3 with the collector current of the transistor BT1. Thus, capacitor C3 integrates the collector current of the transistor BT1. Then, when an exposure time $2^{-Tva}$ or $2^{-Tvp}$ passes from the start of opening of the shutter mechanism, the charge across the capacitor C3 exceeds the voltage across the DC source CE3 and, accordingly, the comparator AC1 produces a "LOW" signal.

The "LOW" signal produced from the comparator AC1 of the exposure control circuit 25 is applied to a transistor BT2 which then turns to a non-conductive state. Accordingly a solenoid Mg connected to the transistor BT2 is de-energized to release a holding member for holding the shutter mechanism in open condition. Thus, upon receipt of the "LOW" signal from the comparator AC1, the solenoid Mg is de-energized to close the shutter mechanism 3.

A switch SW1 shown at the left-hand side of FIG. 4 is a manually operable switch provided to select a mode between an average measuring mode and a spot measuring mode. The switch SW1 includes an arm SW1-N which is connectable to a floating terminal AV or to a ground terminal SP. When the average mode is required, the arm SW1-N is connected to the terminal AV, and when the spot measuring mode is required, the arm SW1-N is connected to the terminal SP. The switch SW1 is connected to an inverter IN1 and, in turn, both to the analog switch AS2 and one input of an AND gate AN1. The nverter IN1 is also connected to another inverter IN2, which is in turn connected to both the analog switch AS1 and one input of an AND gate AN2.

When the arm SW1-N is connected to the floating terminal AV, the inverter IN1 produces a "LOW" signal, and the inverter IN2 produces a "HIGH" signal. Thus, the analog switch AS1 turns on and the analog switch AS2 turns off, thereby carrying out the exposure control operation according to the first voltage signal obtained from the average measuring device 20.

When the arm SW1-N is connected to the ground terminal SP, the inverter IN1 produces a "HIGH" signal, and the inverter IN2 produces a "LOW" signal. Thus, the analog switch AS1 turns off and the analog switch AS2 turns on, thereby carrying out the exposure control operation according to the second voltage signal obtained from the spot measuring device 21.

A switch SW2, shown below the switch SW1 in FIG. 4, is also a manually operable switch provided to select a mode between an automatic exposure control mode and a manual exposure control mode. The switch SW2 includes an arm SW2-N which is connectable to a floating terminal MA or to a ground terminal AU. When the automatic exposure control mode is required, the arm SW2-N is connected to the terminal AU, and when the manual exposure control mode is required, the arm SW2-N is connected to the terminal MA. The arm SW2-N is connected to an inverter IN3 and, in turn, to all the AND gates AN1, AN2, AN3 and AN4. The inverter IN3 is also connected to another inverter IN4, which is in turn connected to both AND gate AN5 and light emitting diode LM for the indication of manual exposure control mode. The input of AND gate AN3 is also connected directly to the terminal JB1 for receiving a charge completion signal from the flash device FL, and the AND gates AN1, AN2, AN4 and AN5 are connected to the terminal JB1 through an inverter IN5. The output of the AND gate AN4 is connected to the analog switch AS3, and the output of the AND gate AN5 is connected to the analog switch AS4.

The charge completion signal as produced from the flash device FL is a "HIGH" signal, and is produced through a know manner when a main capacitor (not shown) provided in the flash device FL for effecting the emission of flash light is charged to a predetermined level necessary for the flash light emission. It is to be noted that the charge completion signal may be produced when a power switch (not shown) of the flash device FL is turned on. An analog switch AS5 is connected directly to the terminal JB1, so that the analog switch AS5 turns on in response to the charge completion signal. A light emitting diode LF1 is also connected directly to the terminal JB1 so that the light emitting diode LF1 emits light when the charge completion signal is produced.

The 3-input AND gates AN1 and AN2, 2-input AND gate AN3 and 2-input OR gate OR1 define an exposure control mode selection circuit 27. The output of the AND gate AN1 is connected to a light emitting diode LP for the indication of spot light measurement, and the outputs of the AND gates AN2 and AN3 are connected to two inputs of the OR gate OR1. The output of the OR gate OR1 is connected to a light emitting diode LA for the indication of average light measurement. The output of the AND gate AN3 is also connected to a resistor r1 and further to the base of switching transistor BT4 of a light amount control circuit 28 described below.

The light amount control circuit 28 is provided for controlling the light amount to be emitted from the flash device FL in real time, and is defined by switching transistor BT4, expansion transistor BT5 for expanding the output from the average light measuring device 20, capacitor C1 for integrating the collector current of the transistor BT5, switching transistors BT3 and BT6 which are turned off in response to the turn on of a synchronizing switch SW5, constant voltage source CE1 for producing a reference voltage representing an appropriate exposure level for the photography with flash light, and comparator AC2.

According to the operation of the light amount control circuit 28 shown in FIG. 4, the transistor BT5 has its base connected to the average light measuring device 20 to receive only the first voltage signal representing the average brightness of the image formed on the film surface 2. The emitter of the transistor BT5 is connected to the collector of the switching transistor BT4. The capacitor C1 is connected across the emitter and collector of the switching transistor BT6 which is normally held in a conductive state. Thus, the capacitor C1 is normally short-circuited. The base of the transistor BT6 is connected through a resistor r2 to the collector of transistor BT3, while the base of the transistor BT3 is connected through diode D3, inverter IN6, one-shot pulse generator OS3, inverter IN7 and resistor r3 to both the synchronizing switch SW5 and the terminal JB3. It is to be noted that a pulse produced from the one-shot pulse generator OS3 has a pulse duration longer than a period for the complete emission of flash light from the flash device FL.

The light amount control circuit 28 is ready to operate when the automatic exposure control mode is selected by the switch SW2 and, at the same time, when the charge completion signal is being applied to the terminal JB1. When the charge completion signal is applied from the terminal JB1 through AND gate AN3 and resister r1 to the base of the switching transistor BT4, the switching transistor BT4 turns on to permit the expansion of the first voltage signal from the average measuring device 20. Then, when the shutter opens to its maximum size, the synchronizing switch SW5 closes in a known manner. Accordingly, the one-shot pulse generator OS3 produces a positive going pulse which is inverted by the inverter IN7. Thus the switching transistor BT3 turns non-conductive and, in turn, the switching transistor BT6 turns non-conductive. Accordingly, the capacitor C2 starts to charge the collector current of the transistor BT5 which is representative of the first voltage signal. When the charge across the capacitor C1 reaches the voltage across the constant voltage source CE1, the comparator AC2 produces a "HIGH" signal, thereby producing a one-shot pulse from each of one-shot pulse generator OS1 and OS2. The one-shot pulse produced from the one-shot pulse generator OS1 is applied through the terminals JB2 and JF2 to the flash device FL to stop the flash light emission. At the same time, the one-shot pulse produced from the one-shot pulse generator OS2 is applied to a light emitting diode LF2 to indicate that the flash light FL is emitted not to the full amount, but to the regulated amount.

Now, the description is particularly directed to the operation of the camera according to the present invention.

The camera according to the present invention operates under three different modes depending upon the use or non-use of the flash device. The three modes are explained hereinbelow.

I. Auto-strobe photographing mode

The exposure is controlled according to a fixed exposure time signal representing the strobe synchronizing shutter speed. The amount of flash light to be emitted from the flash device FL is regulated according to the result of the average light measuring carried out by the average light measuring device 20.

II. Manual strobe photographing mode

The exposure is controlled according to a fixed exposure time signal representing the strobe synchronizing shutter speed. The amount of flash light to be emitted from the flash device FL is not regulated. Thus, the flash device FL emits flash light to its maximum available amount.

III. Daylight photographing mode (1) Average light measuring mode

The exposure is controlled according to the result of average light measurement effected immediately before the photographing.

(2) Spot light measurement mode

The exposure is controlled according to the result of spot light measurement effected immediately before the photographing.

(3) Manual mode

The exposure is controlled according to a set exposure time.

The conditions of switches, inverters, logic gates, and other circuit elements shown in FIG. 4 under each mode are shown in Table 1 below.

TABLE 1

| | Mode | SW1 | SW2 | IN1 | IN2 | IN3 | IN4 | JB1 | IN5 | AN1 | AN2 | AN3 | OR1 |
|---|---|---|---|---|---|---|---|---|---|---|---|---|---|
| Daylight | Average light measuring | AV | AU | L | H | H | L | L | H | L | H | L | H |
| | Spot light measuring | SP | AU | H | L | H | L | L | H | H | L | L | L |
| | Manual | ∅ | MA | ∅ | ∅ | L | H | L | H | L | L | L | L |
| Strobe | Automatic | ∅ | AU | ∅ | ∅ | H | L | H | L | L | L | H | H |
| | Manual | ∅ | MU | ∅ | ∅ | L | H | H | L | L | L | L | L |

| | Mode | AN4 | AN5 | AS1 | AS2 | AS3 | AS4 | AS5 | BT4 | LED |
|---|---|---|---|---|---|---|---|---|---|---|
| Daylight | Average light measuring | H | L | ON | OFF | ON | OFF | OFF | OFF | LA |
| | Spot light measuring | H | L | OFF | ON | ON | OFF | OFF | OFF | LP |
| | Manual | L | H | ∅ | ∅ | OFF | ON | OFF | OFF | LM |
| Strobe | Automatic | L | L | ∅ | ∅ | OFF | OFF | ON | ON | LA, LF1, LF2 |
| | Manual | L | L | ∅ | ∅ | OFF | OFF | ON | OFF | LF1, LM |

Note:
A symbol ∅ indicates that the logic switch can be either ON or OFF.

I. Operation under auto-strobe photographing mode

This mode is accomplished by connecting the arm SW2-N of the switch SW2 to the ground terminal AU. Accordingly, the switch SW2-N is connected to ground to produce a "LOW" signal therefrom. This "LOW" signal is applied to the inverter IN3 and, therefore, the inverter IN3 produces a "HIGH" signal which is applied to one input of each of the AND gates AN3 and AN4. Furthermore, the "HIGH" signal from the inverter IN3 is also applied to another inverter IN4, thereby producing a "LOW" signal from the inverter IN4.

It is assumed that a main capacitor (not shown) provided in the flash device FL mounted on the camera body is charged up to a required level and is ready for the emission of flash light. At this time, since a charge completion signal having a "HIGH" signal is applied from the terminal JF1 of the flash device FL to the terminal JB1 of the camera body, the analog switch AS5 connected to the terminal JB1 turns on, thereby supplying a signal Tvf representing the limit of synchronizing shutter speed from the constant voltage source CE2 to the base of transistor BT1 of the exposure control circuit 25 and to the display device. By the depression of the shutter release button of the camera, the shutter mechanism starts to open and, at the same time, a "HIGH" signal is applied from the comparator AC1 of the exposure control circuit 25 to the base of the transistor BT2, thereby making the transistor BT2 conductive. Thus, the solenoid Mg for driving the shutter mechanism 3 (FIG. 3) is excited, so that the shutter mechanism, which has been opened by the depression of the shutter button, is maintained open by the attractive force of the solenoid Mg. Furthermore, when the shutter mechanism 3 starts to open, the normally closed switch SW4 opens in a known manner. As a result, a collector current corresponding to the limit of synchronizing shutter speed flows through the transistor BT1 and capacitor C3, thereby integrating the collector current in the capacitor C3. Thus, the electrical potential of the capacitor C3 connected to the transistor BT1 gradually decreases as the integration of the collector current proceeds. Thereafter, when the integrated value, i.e., the charged voltage across the capacitor C3 exceeds a reference voltage determined by the constant voltage source CE3, that is, when the voltage applied to the non-inverting input of the comparator AC1 reaches the voltage applied to its inverting input, the comparator AC1 produces a "LOW" signal output, thereby making the transistor BT2 non-conductive. Thus, the solenoid Mg is de-energized to start closing the shutter mechanism. Accordingly, the exposure time is controlled to be equal to a time $2^{-Tvf}$ corresponding to the limit of synchronizing shutter speed. Furthermore, the time $2^{-Tvf}$ is digitally displayed through the display device DP in a known manner.

In the meantime, the "HIGH" signal charge completion signal applied to the terminal JB1 is fed to the other input of the AND gate AN3, thereby producing a "HIGH" level from the AND gate AN3. This "HIGH" signal is applied to the resistor r1 and further to the base of transistor BT4 of the light amount control circuit 28, thereby turning transistor BT4 "ON".

Therefore, from the operational amplifier OA1 of the average light measuring device 20, a signal (Bva+Sv−Av) representing the result of average light measurement under the condition shown in FIG. 3 is applied to the base of the transistor BT5. Thus, the transistor BT5 permits the flow of collector current which is representative of the logarithmically compressed value of the signal (Bva+Sv−Av). Then, as described above, when the shutter 3 opens completely, the synchronizing switch SW5 closes, thereby emitting flash light from the flash device FL to an object to be photographed. Also in response to the closing of the switch SW5, a signal is applied through the diode D3 and inverter IN6 to the one-shot pulse generator OS3, thereby producing a "HIGH" level pulse having a pulse duration longer than the total light emitting period of flash light from the flash device FL. The "HIGH" level pulse from the one-shot pulse generator OS3 is applied to the inverter IN7 and converted to a "LOW" level pulse, which is applied to the base of transistor BT3 through a resistor r3. Thus, the transistor BT3 turns off and, in response to this, the transistor BT6 also turns off. As a result, the collector current of the transistor BT5, which is representative the signal (Bva+Sv−Av) representing the average light amount from the object to be photographed under the aid of flash light, is integrated in the capacitor Cl. Accordingly, the electrical potential of the capacitor Cl connected to the transistor BT5 gradually decreases as the integration of that collector current proceeds. Thereafter, when the voltage across the capacitor Cl exceeds a reference voltage determined by the constant voltage source CEl, that is when the potential at the non-inverting input of the comparator AC2 reaches the inverting input of the same, and the comparator AC2 produces a "HIGH" signal. This "HIGH" signal is applied to the one-shot pulse generator OS1, and from this one-shot pulse generator OS1, a pulse for commanding the stop emission of flash light is applied to the the flash device FL through the terminals JB2 and JF2.

It is to be noted that no matter what position the switch SW1 is turned to, i.e., either to the floating terminal AV for the average light measuring mode or to the ground terminal SP for the spot light measuring mode, the light amount control circuit 28 receives a signal from the average light measuring device 20 and controls the amount of flash light to be emitted from the flash device FL in the manner described above.

As has been described above, the control of the amount of flash light to be emitted from the flash device FL is carried out using the result of the average measurement effected on the entire image formed on the image forming plane S (FIG. 1). Accordingly, the result of the average measurement contains the information of the main object, not only when the main object is situated at the spot A of the plane S, but also when it is situated off from the spot A. Thus, the main object can be photographed with an appropriate light amount aided by the flash light, not only when the main object is situated at the spot A, but also when it is off the spot A. Therefore, with respect to the main object, the amount of flash light can be controlled with a high accuracy and, therefore, the main object can be photographed with an appropriate light amount aided by the flash light, and avoiding the under exposure problem.

The "HIGH" signal produced from the comparator AC2 is also applied to the one-shot pulse generator OS2 from which a pulse having a predetermined pulse width is applied to the light emitting diode LF2. Thus, the light emitting diode LF2 lights to indicate that the amount of light from the flash device FL is controlled.

In the strobe photographing mode described above, the "HIGH" level charge completion signal applied to the terminal JB1 of the camera body is sent to the light emitting diode LF1 which then lights to indicate that the flash device FL is ready to emit flash light. Furthermore, the "HIGH" signal produced from the AND gate AN3 is applied through the OR gate OR1 to the light emitting diode LA which then lights to indicate that the average measurement will be carried out. Moreover, since the inverter IN5 produces a "LOW" signal, the AND gate AN1 produces a "LOW" signal and, therefore, the light emitting diode LP stays in a nonactuated condition even if the spot measuring mode is selected.

II. Operation under manual strobe photographing mode

This mode is accomplished by turning the arm SW2-N of the switch SW2 to the floating terminal MA. Accordingly, the switch SW2-N produces a "HIGH" signal from the power source +V provided in the camera body. The "HIGH" signal from the switch SW2-N is applied to the inverter IN3 which then produces a "LOW" signal. The "LOW" signal from the inverter IN3 is applied to both AND gates AN3 and AN4, whereby both AND gates AN3 and AN4 produce a "LOW" signal. The "LOW" signal from the AND gate AN3 is applied to the base of the transistor BT4 of the light amount control circuit 28, thereby turning off the transistor BT4. Thus, the transistor BT5 also turns off to maintain the light amount control circuit 28 in a non-actuated condition. Furthermore, the "LOW" signal from the AND gate AN4 is applied to the analog switch AS3, thereby turning off the analog switch AS3.

The "LOW" signal from the inverter IN3 is also applied to the inverter IN4 from which a "HIGH" signal is produced. The "HIGH" signal from the inverter IN4 is applied to the AND gate AN5 and also to the light emitting diode LM. Accordingly, the light emitting diode LM lights to indicate that the manual strobe photographing mode is selected. Also, in a manner similar to that described above under the subtitle "I. Operation under auto-strobe photographing mode", the "HIGH" charge completion signal is applied from the flash device FL to the terminal JB1 of the camera body and further to the analog switch AS5, thereby turning on the analog switch AS5. Thus, through the analog switch AS5, a signal Tvf representing a shutter speed limit that provides synchronization with the flash light is applied from the constant voltage source CE2 to the base of the transistor BT1 of the exposure control circuit 25. Then, the exposure control circuit 25 controls the exposure in a similar manner as described above. Also, the light emitting diode LF1 lights upon receipt of the charge completion signal to indicate that the flash device FL is ready to emit flash light.

III. Operation under daylight photographing mode

This mode has three sub-modes which are: (1) an average light measuring mode; (2) a spot light measuring mode; and (3) a manual mode. For accomplishing the average light measuring mode (1) or the spot light measuring mode (2), the arm SW2-N of the switch SW2 is turned to the ground terminal AU. It is to be noted that under these sub-modes, the charge completion signal will not be applied from the flash device FL to the terminal JB1 of the camera body. Accordingly, the other input of the AND gate AN3 is maintained at a "LOW" signal to produce a "LOW" signal from the AND gate AN3. Thus, the transistor BT4 of the light amount control circuit 28 is turned off and, as a result, the transistor BT4 is also maintained off. Thus, the light amount control circuit 28 is held inactive. Also, the one input of the AND gate AN4 receives a "HIGH" signal from the inverter IN3 in a similar manner described above under the subtitle "I. Operation under auto-strobe photographing mode", while the other input thereof receives a "HIGH" signal from the inverter IN5 (which is receiving a "LOW" signal from the terminal JB1). Thus, the AND gate AN4 produces a "HIGH" signal which is applied to the analog switch AS3, whereby the analog switch AS3 is turned on.

In the sub-mode of average light measuring mode (1), the arm SW1-N of the switch SW1 is turned to the floating terminal AV. Thus, the arm SW1-N conducts the "HIGH" signal from power source +V which is inverted to a "LOW" signal by the inverter IN1. The "LOW" signal from the inverter IN1 is again inverted to a "HIGH" signal by the inverter IN2. Thus, the analog switch AS1 connected to the inverter IN2 turns on upon receipt of the "HIGH" signal from the inverter IN2, and at the same time, the analog switch AS2 connected to the inverter IN1 turns off upon receipt of the "LOW" signal from the inverter IN1. Accordingly, a signal Bva+Sv-Avo representing the result of the average light measurement is applied from the average light measuring device 20 through the analog switch AS1 to the exposure time calculation circuit 23.

The light receiving element PDA provided in the average light measuring device 20 carries out the light measurement under the condition shown in FIG. 2, i.e., the condition before the shutter 3 opens.

From the signal Bva+Sv−Avo from the average light measuring device 20 and a signal Avs−Avo representing the set aperture size, obtained from the variable voltage source VE2, the exposure time calculation circuit 23 calculates an exposure time Tva=Bva+Sv−Avs in the APEX numbering system.

Thereafter, when the exposure control operation starts upon depression of the shutter button, the switch SW3 of the sample-and-hold circuit 24 turns off in a known manner so that a signal representing the calculated exposure time Tva is stored in the capacitor C2. The signal stored in the capacitor C2 is applied to the base of the transistor BT1 of the exposure control circuit 25 through the analog switch AS3, in a manner described above, and also to the display device DP. As a result, the exposure control circuit 25 operates in the same manner described above under the subtitle "I. Operation under auto-strobe photographing mode" such that the comparator AC1 produces a "LOW" signal after passing the exposure time $2^{-Tva}$ from the start of the opening of the shutter 3. This "LOW" signal from the comparator AC1 is applied to the base of the transistor BT2, thereby de-energizing the solenoid Mg and closing the shutter 3.

In the sub-mode of spot light measuring mode (2), the arm SW1-N of the switch SW1 is connected to the ground terminal SP. Unlike the sub-mode (1) described above, the arm SW1-N produces a "LOW" signal, and therefore, the inverter IN1 produces a "HIGH" signal and the inverter IN2 produces a "LOW" signal. Thus, the analog switch AS2 is turned on and, at the same time, the analog switch AS1 is turned off. As a result, a signal (Bvp+Sv−Avo) representing the result of spot measuring is transferred from the spot measurement device 21 through the analog switch AS2 to the exposure time calculation circuit 23. And, in turn, from the exposure time calculation circuit 23, a signal presenting the calculated exposure time Tvp=Bvp+Sv−Avs in the APEX numbering system is produced. Then, in a similar manner described above for the sub-mode (1), the exposure control operation is carried out using the calculated exposure time Tvp, thereby opening the shutter 3 for a period of time $2^{-Tvp}$.

It is to be noted that under the average light measuring mode (1), the AND gate AN2 receives a "HIGH" signal to each of its three inputs from the inverters IN2, IN3 and IN5, thereby producing a "HIGH" signal from the AND gate AN2. This "HIGH" signal from the AND gate AN2 is applied through the OR gate OR1 to the light emitting diode LA which then lights to indicate that the average light measurement is carried out. Contrary to the above operation, under the spot light measuring mode (2), the AND gate AN1 receives a "HIGH" signal to each of its three inputs from the inverters IN1, IN3 and IN5, thereby producing a "HIGH" signal from the AND gate AN1. This "HIGH" signal from the AND gate AN1 is applied to the light emitting diode LP which then lights to indicate that the spot light measurement is carried out.

For accomplishing the manual mode (3), the arm SW2-N of the switch SW2 is turned to the floating terminal MA. Thus, in the same manner described above under the subtitle "II. Operation under manual strobe photographing mode", the AND gate AN5 receives a "HIGH" signal to its one input from the inverter IN4 and, at the same time, receives a "HIGH" signal to its other input from the inverter IN5. Thus, the AND gate AN5 produces a "HIGH" signal which is applied to the analog switch AS4 for turning on the same. Thus, a signal representing the set exposure time Tvs in the APEX numbering system is manually set by the photographer by way of the variable voltage source VE3 and is transferred from the variable voltage source VE3 through the analog switch AS4 to the base of the transistor BT1 of the exposure control circuit 25 and also to the display device DP. As a result, the shutter 3 opens for a set period of time $2^{-Tvs}$ in a similar manner as described above.

It is to be noted that, like the average light measuring mode (1) and the spot light measuring mode (2), the AND gate AN3 under the manual mode (3) is maintained to produce a "LOW" signal, thereby holding the light amount control circuit 28 in the inactive state.

As has been described above, the automatic exposure control camera according to the present invention has a control system such that in the strobe photographing mode, a signal representing the result of the average light measurement of the entire light impinging on the image forming plane, i.e., film surface, with the aid of flash light is integrated, and when the integrated amount reaches a predetermined level which provides an appropriate exposure, a signal is applied to the flash device to stop the emission of flash light. Therefore, so long as the main object is located within the film frame, it may be either at a center or at a corner thereof, the amount of reflected light from the main object under the aid of flash light can be measured accurately by the average light measuring device. Therefore, with the aid of flash light, the main object can be photographed with an appropriate light amount. Thus, an error wherein the exposure amount for the main object is below the required level can be avoided, thereby always providing a fine photograph of the main object even if the main object is located at a corner of the film frame.

Although the present invention has been fully described with reference to a preferred embodiment, many modifications and variations thereof will now be apparent to those skilled in the art, and the scope of the present invention is therefore to be limited not by the details of the preferred embodiments described above, but only by the terms of the appended claims.

What is claimed is:

1. An automatic exposure control camera capable of controlling both the camera exposure and the flash light amount to be emitted by an electronic flash device comprising:
    means for measuring light and capable of alternatively producing a first signal indicative of a light measuring result covering a relatively wide area of the object scene and a second signal indicative of a light measuring result covering a relatively narrow area of the object scene;
    first means for automatically controlling the camera exposure in response to said first signal and said second signal and including means for selectively storing either said first or second signal prior to actual exposure, said first controlling means being respective to the signal stored by said storing means;
    second means for automatically controlling the flash light amount in response to said first signal; and
    means for selecting said first controlling means from said second controlling means to respond to said first and second signals, said selecting means including first means for interconnecting said first controlling means with said measuring means to enable said first controlling means to selectively respond to either of said first and second signals in controlling the camera exposure, and said selecting means further including second means for interconnecting said second controlling means with said measuring means to restrict said second controlling means to respond to said first signal in controlling the flash light amount.

2. The automatic exposure control camera according to claim 1 further comprising a semi-transparent reflex mirror movable between a projecting position and a retracting position, and means containing a film, wherein said measuring means includes means for receiving light and located to receive light reflected at the film surface with said reflex mirror in the retracting position, and means for projecting light transmitted through said reflex mirror to said receiving means with said reflex mirror in the projecting position.

3. The automatic exposure control camera according to claim 2, wherein said second controlling means includes means for carrying out the flash light control during actual exposure in response to said first signal.

4. The automatic exposure control camera according to claim 1, wherein said second controlling means includes means for integrating said first signal after the initiation of firing of the flash light to transmit a flash terminating signal to the electronic flash device when the integrated first signal reaches a predetermined level.

5. The automatic exposure control camera according to claim 1, further comprising means for indicating exposure information in respone to said first or second signal, and third means for interconnecting said indicating means with said measuring means to enable said indicating means to selectively respond to either of said first and second signals in indicating the exposure information.

6. The automatic exposure control camera according to claim 1, wherein said first interconnecting means includes means for determining whether said first controlling means responds to said first signal or to said second signal.

7. The automatic exposure control camera according to claim 1, further comprising means for providing an exposure control signal to said first controlling means with said second controlling means being selected by said selecting means.

8. The automatic exposure control camera according to claim 1, wherein said second controlling means includes means for carrying out the flash light control during actual exposure in response to said first signal.

9. An automatic exposure control camera capable of controlling both the camera exposure and the flash light amount to be emitted by an electronic flash device comprising:
    means for measuring light capable of alternatively producing a first signal indicative of a light measuring result covering a relatively wide area of the object scene and a second signal indicative of a light measuring result covering a relatively narrow area of the object scene;

means for automatically controlling the camera exposure in response to either of said first and second signals and including means for selectively storing either said first or second signal prior to actual exposure, said automatic controlling means being responsive to the signal stored by said storing means;

means for electrically connecting the camera with the electronic flash device to control the flash light amount in response to said measuring means; and means for interconnecting said connecting means with said measuring means to restrict the control of flash light amount in response to said first signal.

10. An automatic exposure control camera capable of controlling both the exposure of the film to the scene light and the flash light amount to be emitted by an electronic flash device;

a semi-transparent reflex mirror movable between a projecting position and a retracting position;

means for measuring light and capable of alternatively producing a first signal indicative of a light measuring result covering a relatively wide area of the object scene and a second signal indicative of a light measurement result covering a relatively narrow area of the object scene, including means for receiving light and located to receive light reflected at the film surface with said reflex mirror in the retracting position and means for projecting light transmitted through said reflex mirror to said receiving means with said reflex mirror in the projecting position;

means for automatically controlling the exposure of the film to the scene light in response to either of said first and second signals produced with said reflex mirror in the projecting position; and means for electrically connecting the camera with the electronic flash device to control the flash light amount, said connecting means including means for restricting the control of flash light amount to a response to said first signal produced with said reflex mirror in the retracting position.

* * * * *